INVENTOR.
CHARLES S. REIS
BY
Flehr and Swain
ATTORNEYS

INVENTOR.
CHARLES S. REIS
BY
*Flehr and Swain*
ATTORNEYS

Jan. 26, 1965  C. S. REIS  3,167,642
PORTABLE ELECTRIC OVEN
Filed July 27, 1961  3 Sheets-Sheet 3

INVENTOR.
CHARLES S. REIS
BY
Flehr and Swain
ATTORNEYS

United States Patent Office 3,167,642
Patented Jan. 26, 1965

3,167,642
PORTABLE ELECTRIC OVEN
Charles S. Reis, 210 Thompson Ave.,
Mountain View, Calif.
Filed July 27, 1961, Ser. No. 127,325
3 Claims. (Cl. 219—413)

This invention relates generally to ovens and more particularly to a spherical oven which is decorative and functionally efficient.

In recent times, there has been a trend in appliances towards becoming more portable and more decorative whereby they may be used not only in the kitchen but also in the patio, dining room, other areas of the home, and other places where it might be desirable to serve hot food. Notable entries in this field have been portable toasters, frying pans and griddles.

These appliances are acceptable for the preparation of relatively small or informal meals. However, there are no acceptable portable ovens for the preparation of full meals in places other than the kitchen. Portable roasters and the like are, in general, not esthetically attractive for use outside the kitchen.

It is a general object of the present invention to provide an improved portable oven.

It is another object of the present invention to provide a portable oven which is not only esthetically acceptable but is also functionally efficient.

It is still a further object of the invention to provide an oven which is simple in construction and relatively inexpensive to manufacture.

It is a further object of this invention to provide an oven having the aforementioned characteristics which is sufficiently light to be portable and at the same time sufficiently insulated to prevent excessive heat losses.

It is still a further object of the present invention to provide an oven having the aforementioned characteristics which includes two insulated hemispherical bodies rotatable with respect to one another supported in spaced relationship on a base.

It is still a further object of the present invention to provide an oven including a pair of insulated hemispheres which are supported from rings mounted on a base for rotation with respect to one another.

These and other objects and features of the invention will become more clearly apparent from the following description when taken in conjunction with the accompanying drawings.

Referring to the drawings.

Figure 1:
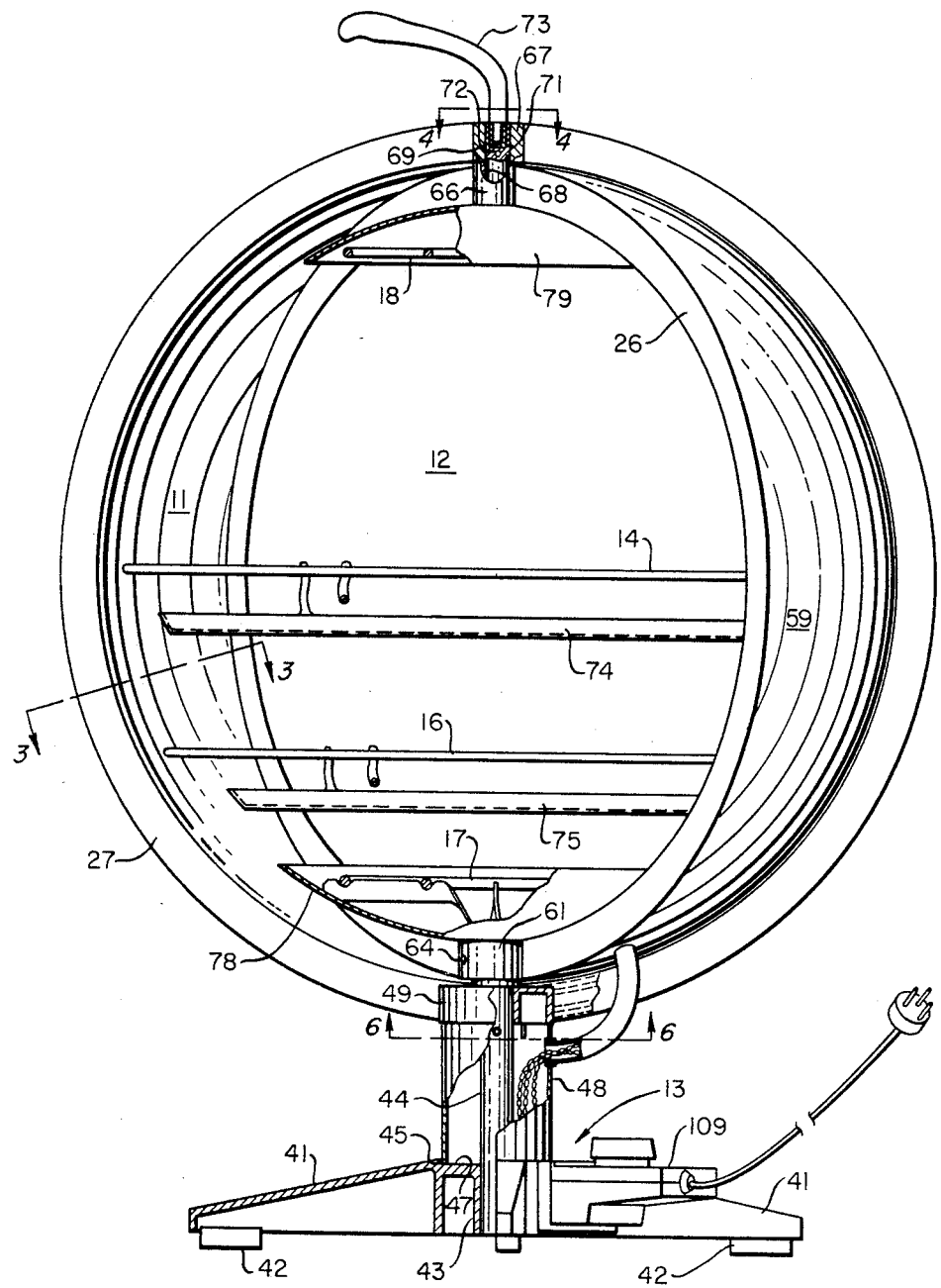
FIGURE 1 is a front elevational view, partly in section, showing an oven in accordance with the invention.

Referring to FIGURE 1, the oven includes first and second insulated hemispheres 11 and 12 which are supported in spaced relationship with respect to one another on a base designated generally by the reference numeral 13. The insulated hemispheres are rotatable with respect to one another whereby the oven may be opened by rotation of one of the hemispheres to expose the shelves 14 and 16. The insulated hemispheres overlap slightly at the edges whereby upon rotation, the oven may be closed to form a substantially spherical insulated oven enclosure.

A bottom heater 17 is provided as well as an upper heater 18. A suitable circuit for selectively energizing the heaters will be presently described.

Figure 3:
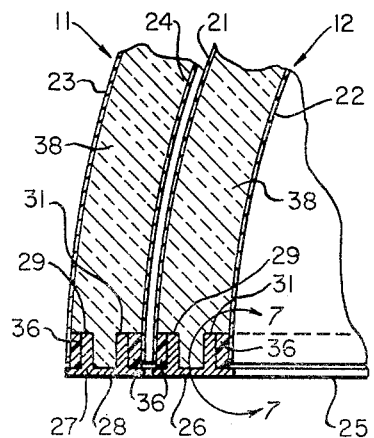
FIGURE 3 is a detailed sectional view taken along the line 3—3 of FIGURE 1 showing the construction of the hemispherical halves.

Each of the insulated hemispheres includes a pair of spaced hemispherical shells with insulation disposed between the same. Referring to FIGURE 3, the shells 21 and 22 are employed for the inner hemisphere 12, while shells 23 and 24 are employed for the outer hemisphere 11. Each of the pairs of shells 21, 22 and 23, 24 are held in spaced relationship by rings 26 and 27, respectively. Each of the shell rings 26 and 27 includes an annular face plate 28; each is also provided with a pair of spaced ribs 29, 31. The ribs 29, 31 are spaced from the edge face plate 28. The hemispherical shells are supported at their edges by insulating rings 36 disposed in the annular recess or shoulder formed by the ribs and face plate.

Figure 7:
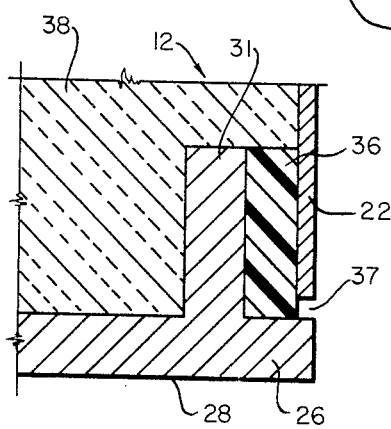
FIGURE 7 is an enlarged detailed view taken along the line 7—7 of FIGURE 3.

Referring to FIGURE 7, it is noted that the shell 22 has its edge supported by the ring 36 and its exposed edge spaced a distance 37 from the ring 26. Thus, the thermal contact between the ring and the shell is through the thermal insulating material 36 whereby heat loss by thermal conduction is minimized. The remainder of the rings between the ribs 29, 31 and the edge of the hemispherical shells 21, 22 and 23, 24 are mounted in a similar fashion whereby the hemispherical shells are in insulated relationship with respect to one another and the rings 26 and 27. The space between the hemispherical shells 21, 22 and 23, 24 is preferably filled with insulating material 38 such as fiberglass to further reduce the transfer of heat between the inner and outer shells of each insulated hemisphere 22 and 12.

Figure 2:
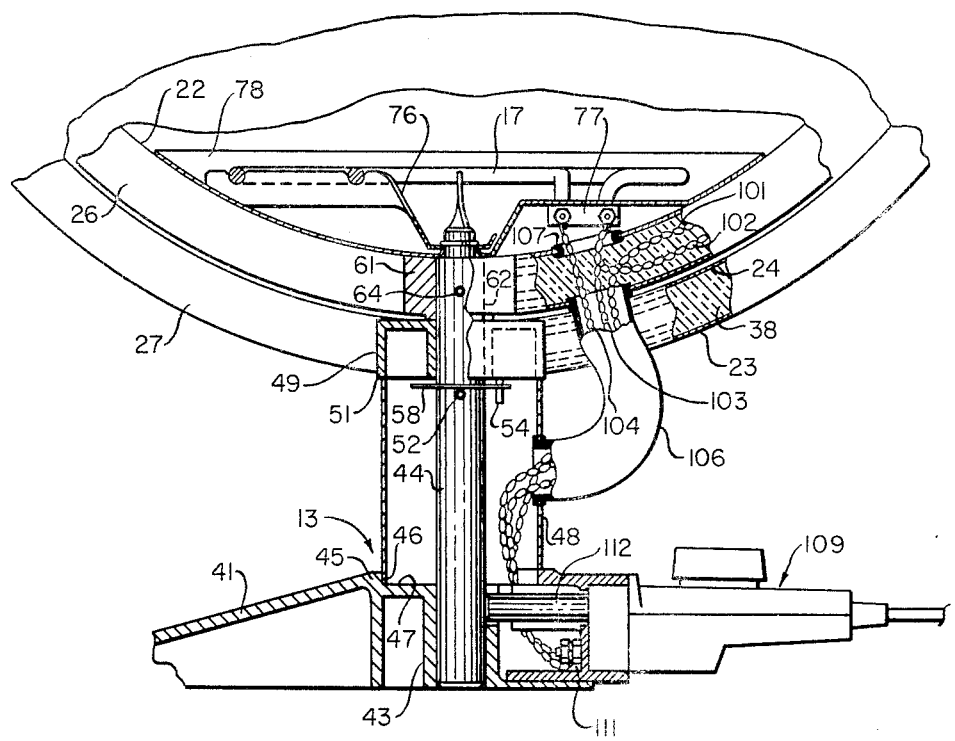
FIGURE 2 is an enlarged partial front elevational view of the oven shown in FIGURE 1 with particular emphasis on the oven wiring and base support.

The hemispheres are supported in spaced relationship from a base 13. Referring more particularly to FIGURES 1 and 2, the base includes a plurality of legs 41 provided with feet 42. The legs support a hub 43 which receives a vertical support shaft 44. The hub 43 also includes a circular concentric rim 45 which forms a shoulder 46. The face 47 of the hub 43 receives and supports a sleeve 48 and the shoulder 46 restrains the same from sidewise sliding movement on the face.

A lower boss 49 is formed on the outer shell support ring 28 and includes a central opening which rotatably fits onto the support shaft 44. The outer rim 51 of the boss 49 rides on the top of the support sleeve 48. Thus, the outer shell support ring is rotatably mounted on the support shaft 44 and is supported by the sleeve 48 whereby the outer insulated hemisphere may be rotated about the axis of the shaft to open and close the oven.

Figure 6:
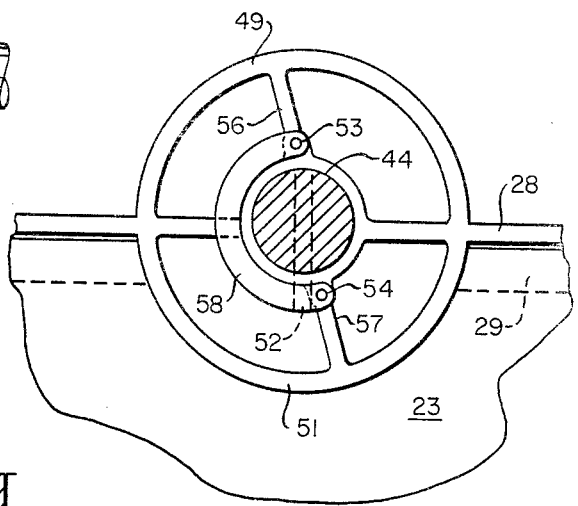
FIGURE 6 is a bottom view taken along the line 6—6 of FIGURE 1 showing the support sleeves and shaft in section.

A stop pin 52 is carried on the shaft 44 and cooperates with angularly spaced pins 53 and 54 (FIGURE 6) secured to the ribs 56 and 57, respectively. Rotation of the outer hemisphere is limited to approximately 180°. To assure that the outer hemisphere is retained closed or open, there is provided a toggle spring 58. The configuration of a toggle spring is seen in FIGURE 6. It is seen that it is C-shaped with the ends including openings which receive the pins 53 and 54. The angular extent of the spring is greater than the angular spacing of the pins 53 and 54 whereby the spring buckles downwardly and rides against the pin 52. Thus, it is seen that at the two ends of the spring, the pin 52 barely touches the spring, while in the middle portion of travel the buckled portion of the spring will bear upon the pin urging the same to rotate in a direction dependent upon which side of center of the ridge the pin engages the spring.

The inner shell support ring 26 includes a lower boss 61 having a central opening 62 which is fitted over the support shaft 44. A pin 64 extends through the boss and shaft and serves to lock the inner hemisphere to the shaft whereby it will not rotate with respect thereto.

Thus, the inner hemisphere is held in fixed relationship, while the outer hemisphere is rotatably supported. The toggle spring assures that the outer hemisphere rotates to its two extreme positions with the pin 52 either abutting the pin 53 or 54.

Figure 4:
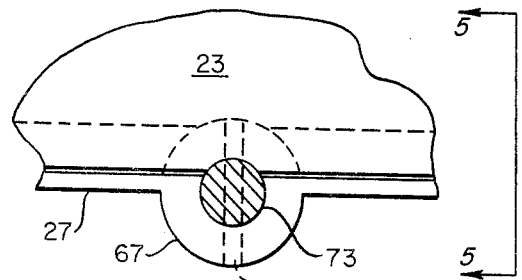
FIGURE 4 is a top plan view taken along the line 4—4 of FIGURE 1 showing the handle section.
Figure 5:
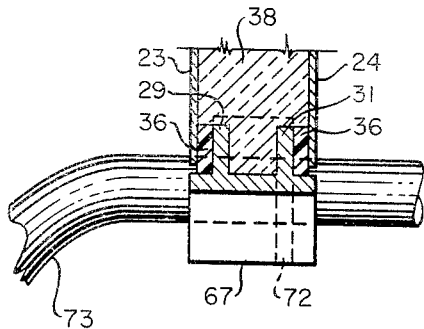
FIGURE 5 is a sectional view taken along the line 5—5 of FIGURE 4.

Each of the shell rings 26 and 27 includes an upper boss 66 and 67, respectively (FIGURES 1 and 4). The bosses 66 and 67 include openings 68 and 69, respectively, which openings receive the shaft 71. A pin 72 passes through the upper boss 67 and serves to lock the shaft to the outer sphere. The shaft extends downwardly and is rotatably received within the opening 68 formed in the boss 66. A handle 73 may be suitably secured to the shaft as, for example, by a pin (not shown) or may be threadably received by the shaft. Rotation of the handle 73 serves to rotate the outer sphere with respect to the inner sphere for opening or closing of the oven.

Shelves 14 and 16 are removably held by the inner sphere shell 22. Clips may be provided on the inner shell to receive and hold the shelves. If desired, one or more removable drip pans 74 and 75 may be provided below each of the shelves to collect drippings.

The lower heating element 17 may be coiled and supported on a support shelf 76 secured, for example, to the upper end of the shaft 44. The heater unit is connected to the terminal block 77. A similar heating unit is connected to the upper end of the inner hemisphere and is secured to the top shaft 71. Reflectors 78 and 79 may be retained behind the heater supports and serve to reflect the radiant energy.

Electrical connection may be made through beaded conductors 101, 102, 103 and 104 which extend upwardly through the flexible insulating sleeve 106 secured to the outer shell 21 of the inner hemisphere. Grommet 107 insulates the leads from the inner shell 22 of the inner hemisphere. The leads 101 and 102 extend upwardly through the insulation and are electrically connected to the upper heater.

Power is supplied through a thermostat unit 109 to terminal block 111. The heater leads are connected to the thermostat at the terminal block 111. The thermostat unit includes a temperature sensing prong 112 which extends inwardly and makes thermal contact with the shaft 44. The shaft 44 is preferably made of high heat conducting material whereby the heat is conducted axially downward along the shaft and to the prong 112 which controls operation of the thermostat.

Figure 8:
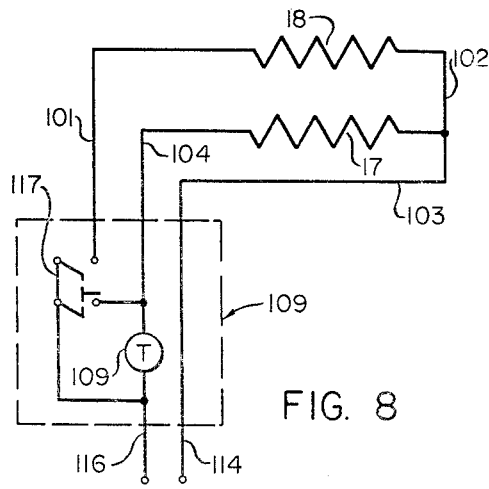
FIGURE 8 is a suitable electrical wiring diagram illustrating the wiring of the oven.

Referring more particularly to FIGURE 8, a schematic circuit diagram of the thermostat unit and heaters is shown. One side of both the lower heater and the upper heater units 17 and 18 is connected directly to one line terminal 114 through the wires 102 and 103. The other side of the upper heater unit 18 is connected to the other line terminal 116 through a switch 117.

The switch provides means whereby the thermostat 109 is bypassed and the line 101 connected directly to the terminal 116 or to the terminal 116 through thermostate 109. Thus, with the switch in its open condition, the lower heater is only operable in response to the thermostat. The upper heater is independent of the thermostat and may be employed for broiling. With the switch in its closed position, both heater units are operable without respect to the thermostat 109.

Thus, it is seen that there is provided a novel appliance which is esthetic in appearance, efficient in operation and relatively inexpensive to manufacture.

I claim:

1. An oven comprising a base, a support shaft of thermal conductive material extending upwardly from the base, inner and outer insulated hemispheres, said inner hemisphere being supported by said shaft and said outer hemisphere being rotatable on the shaft, said shaft extending into the oven, mounting means comprising a support sleeve carried by said base and rotatably supporting said outer hemisphere whereby the outer hemisphere may be rotated with respect to the inner hemisphere to open and close the oven, toggle means cooperating with said outer hemisphere to hold the same in the open and closed positions, heating means supported within the oven for heating articles placed therein, and a thermostat connected to control said heating means, said thermostat being associated with the support shaft to sense the oven temperature to control the same.

2. An oven comprising a base, a vertical support shaft of thermal conductive material extending upwardly from said base, inner and outer insulated hemispheres, each said hemisphere including inner and outer spaced hemispherical shells supported in spaced relationship by a ring, insulation disposed between the spaced hemispherical shells forming each of said inner and outer insulated hemispheres, the ring of the inner hemisphere being fixedly mounted on the support shaft, said shaft being exposed to the interior of said inner hemisphere, and the ring of the outer hemisphere being rotatably mounted on the support shaft, a support sleeve carried by the base and serving to rotatably support the outer hemisphere whereby the outer hemisphere may be rotated to open and close the oven, heating means supported within the oven for heating articles placed therein, and a thermostat connected to control said heating means, said thermostat being associated with the support shaft to sense the oven temperature to control the same.

3. An oven as defined in claim 2 wherein said outer shells are spaced from the exterior peripheral edge of their respective rings and said inner shells are spaced from the interior peripheral edge of said rings whereby heat transfer from said inner to said outer shells via said rings is minimized.

References Cited in the file of this patent

UNITED STATES PATENTS

| | | |
|---|---|---|
| 605,473 | Burns | June 14, 1898 |
| 676,732 | Bohem | June 18, 1901 |
| 1,502,131 | Vaudreuil | July 22, 1924 |
| 2,593,233 | White | Apr. 15, 1952 |
| 2,596,316 | White | May 13, 1952 |